Dec. 31, 1957 W. F. COLLINS 2,817,943
TILTING, RAISING AND LOWERING MECHANISM
FOR WINDROW HARVESTER PLATFORMS
Filed Aug. 19, 1953 3 Sheets-Sheet 1

INVENTOR.
William F. Collins
Paul O. Pippel
Atty.

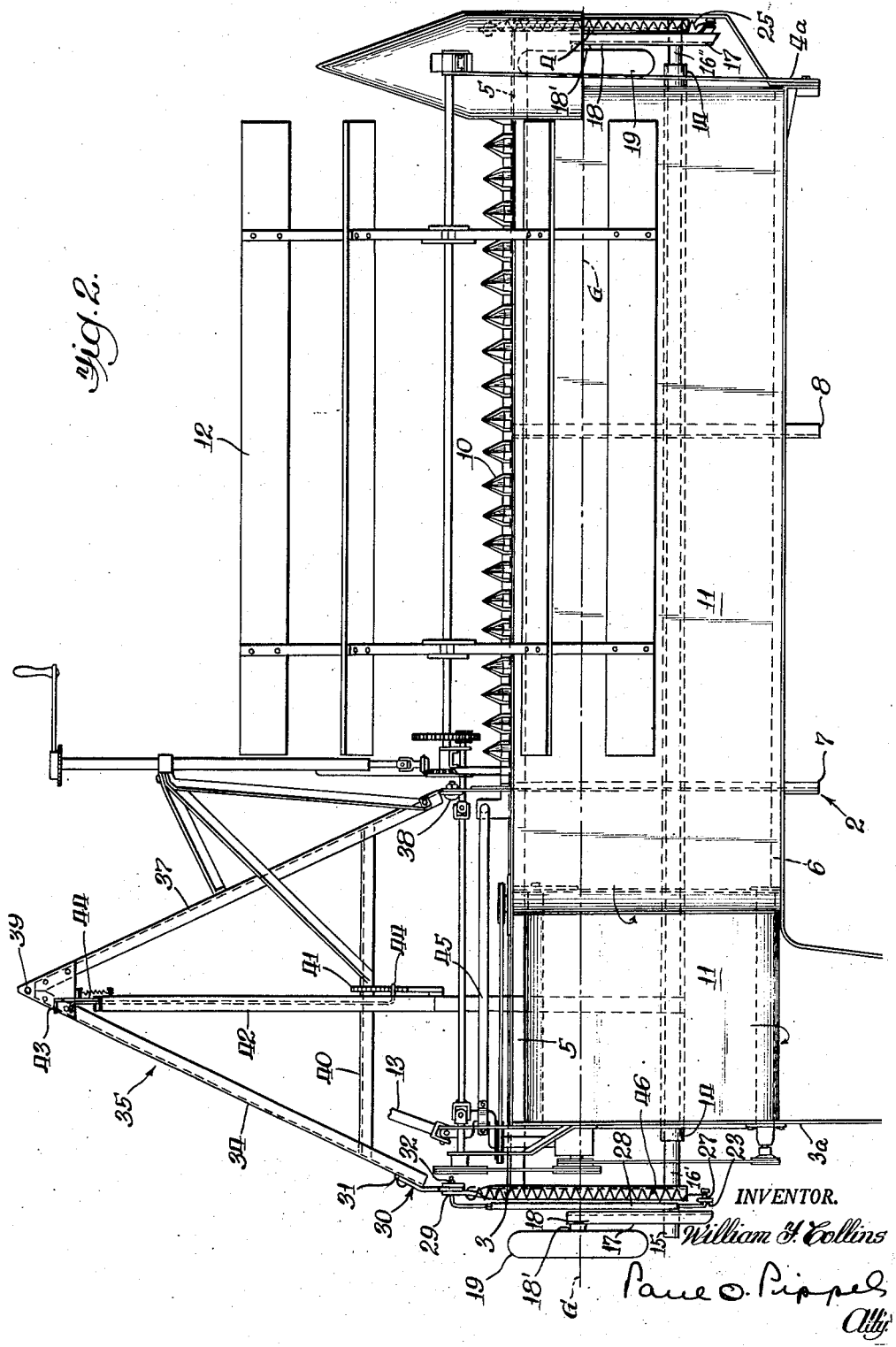

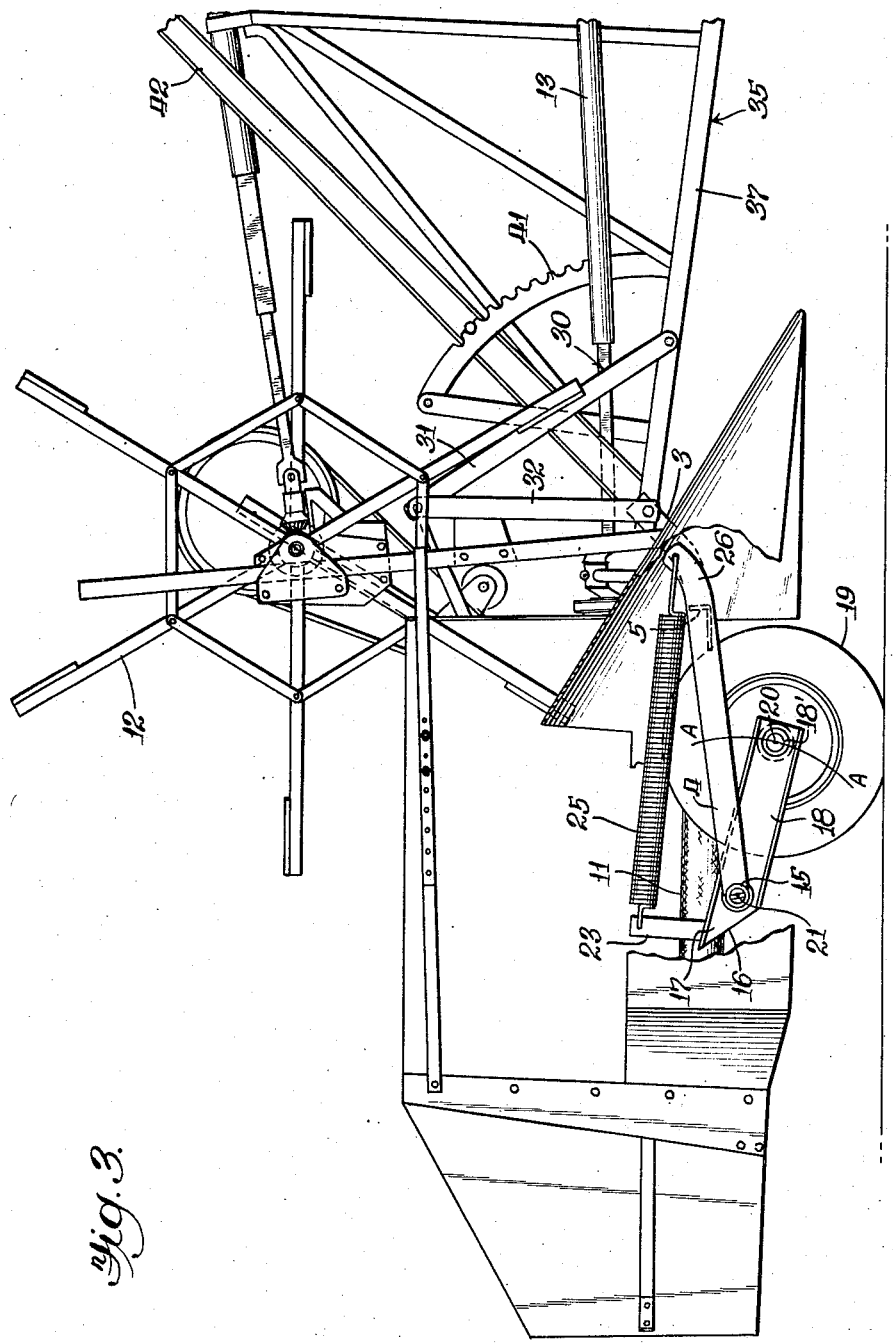

United States Patent Office 2,817,943
Patented Dec. 31, 1957

2,817,943

TILTING, RAISING AND LOWERING MECHANISM FOR WINDROW HARVESTER PLATFORMS

William F. Collins, Downers Grove, Ill., assignor to International Harvester Company, a corporation of New Jersey Application August 19, 1953, Serial No. 375,156

2 Claims. (Cl. 56—208)

This invention relates to harvesting machines which embody a platform with a forward cutter, and more specifically the invention appertains to a novel suspension system for the platform.

A general object of the invention is to devise such a suspension system which will obtain a maximum vertical adjustment of the platform.

A further object of the invention is to devise a suspension which will control the position of the platform such that in the lowermost position, the platform is tilted downwardly forwardly in order to bring the cutter bar close to the ground, while at the same time the platform suspension beneath the platform is accommodated maximum clearance with respect to the ground.

A more specific object of the invention is to devise a suspension for the harvester platform comprising a pair fo bell crank members at opposite ends of the platform and interconnected to operate conjunctively, each member having a forwardly projecting end or arm with a ground-engaging wheel thereon and each lever forming part of a generally parallelogram-like linkage which controls the tilt of the platform in accordance with its position relative to the ground.

The invention comprehends a suspension system wherein the axis of rotation of the support wheels is substantially coincident with the center of gravity of the platform in an intermediate position of the platform; that is, between its lowermost and uppermost positions and wherein in all other positions of the platform, the axis of rotation of the wheels is disposed in close proximity to the vertical plane of the center of gravity of the platform whereby the platform is substantially balanced fore and aft of the axis of rotation of the wheels to provide minimum resistance to raising and lowering of the platform.

These and other objects of the invention will become more apparent from the specification and the drawings, wherein:

Figure 2 is a plan view of the novel windrow harvester; and

Figure 3 is a broken apart end view of the windrow harvester, taken from the grainward end thereof.

Figure 1:
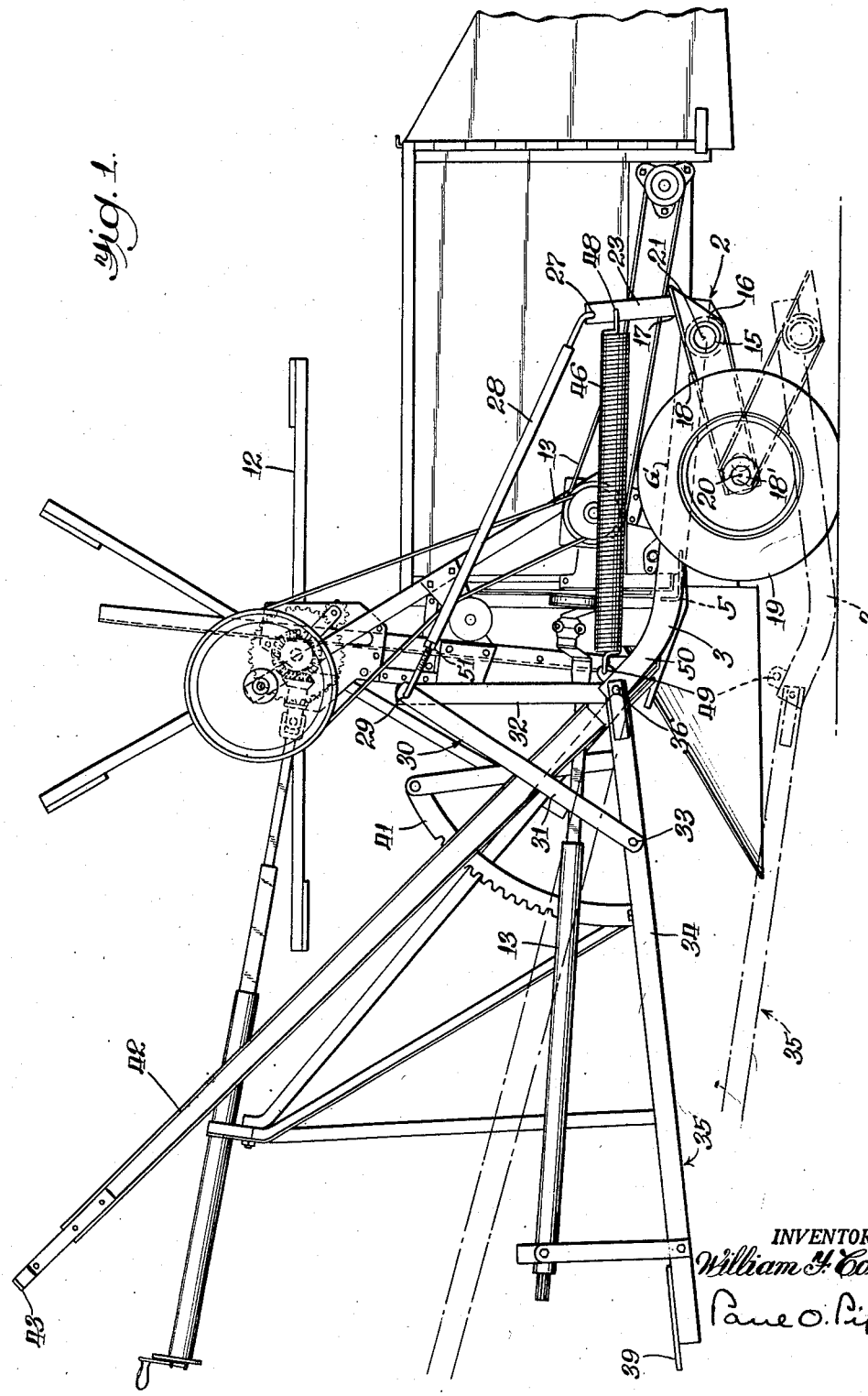
Figure 1 is an end-elevational view of the novel windrow harvester incorporating the invention, taken from the stubbleward end thereof.

Inasmuch as a large portion of the structure and mechanisms herein shown are conventional, no attempt has been made to be exact and complete in the showing of all details. It is assumed that the design and connections, where not clearly illustrated, will be readily understood from their outline or diagrammatic appearance in the drawings taken with the following description.

The windrow construction, in accordance with the invention, comprises a main supporting platform frame, generally designated 2, formed of a pair of inner and outer end bars or members 3 and 4 extending fore and aft at the stubbleward and grassward ends 3a and 4a and a pair of transverse front and rear beam members 5 and 6 which define the forward and rear edges of the platform and are interconnected by a plurality of members 7 and 8 secured together so as to provide a support for a cutting mechanism 10, a conveyor mechanism 11, a reel mechanism 12, operating means 13 for the cutting and conveying and reel mechanisms 10, 11 and 12.

The foundation support structure 2 incorporates a transverse tube 14 weld connected to the end members 3 and 4 and members 7 and 8 and disposed rearwardly of the center of gravity of the platform, as indicated by line G—G of Figure 2 and point G in Figure 1, and within the tube 14 a rock shaft 15 is rotatably mounted, said shaft 15 having each end or extremity 16' and 16'' conected to an elbow 16 of a bell crank lever 17 which has a forwardly or fore and aft extending leg or wheel-supporting arm 18 provided with a transverse pintle or axle 18' mounting a wheel 19, the axis 20 of the axle 18' extending lengthwise of the platform and disposed such a distance from the horizontal axis of pivot 21 of the rock shaft that in the intermediate position of the platform, it coincides with the center of gravity of the platform and identified by the said point G in Figure 1. This provides for maximum balance of the harvester and permits the use of light linkage to position it. The arcuate locus of axis 20 is designated by the line A—A of Figure 3.

Each lever 17 has an integral upright arm or leg 23 and the upper end of the grainward end lever arm 23 is hooked to a counter-balancing spring 25 which at its forward end is connected to an upturned forward end portion or anchor portion 26 of the side member 4. The lever 17 on the stubbleward end has the upper end of its arm 23 pivoted as at 27 to the rear end of a diagonal upwardly and forwardly fore and aft extending link element 28 which at its forward end is pivoted as at 29 to the upper end of an upright link element or upstanding standard, generally designated 30, which comprises a diagonal element 31 and an upright element 32 which are interconnected at said point 29, the lower end of element 31 is connected at 33 to a beam member 34 of hitch frame 35 which member 34 is connected at its rear end to the lower end of member 32 by a pintle or pin 36 which passes through the forward end of the side element or beam 3 of the platform framework.

The hitch or draft frame 35 is A-shaped in plan and in addition to the side beam 34 has a side beam member 37 which is pivoted to a bracket on the forward end of cross beam 7 of the platform as at 38 on an axis co-axial with the pin 36 which extends generally parallel to the rock shaft 15. The hitch frame members extend and converge forwardly of the platform frame to provide a hitch point 39 for connection to an associated tractor and are interconnected intermediate their ends by a cross-bar 40 which carries a quadrant 41 cooperatively associated with an operating lever 42 which has a forward end handle 43 positioned for ready reach by an operator of the associated tractor. The lever bar has associated therewith a latch mechanism 44 which cooperates with the quadrant to hold the lever 42 in adjusted position. The rear end portion 45 of lever assembly 42 is connected to the front beam member 5 and the tube 14 whereby the lever and platform are movable together between the positions shown in Figure 1.

It will be noted that a balancing spring 46 has one end connected at 48 to the lever arm 23 of Figure 1 intermediate its ends and has its other end connected at 49 to an upturned forward end portion or anchor portion 50 of member 3 of the platform.

In Fig. 1 the link 28 is shown adjustable or extensible at 51 to control the arc of movement of the platform such that in the lowermost position the platform is tilted downwardly forwardly to dispose the cutter bar close to the terrain and in the uppermost position of the platform it is substantially horizontal.

It will be understood that the novel pantographic or parallelogram type tilt-control linkage 23, 28, 30 and 3 is disposed in a substantially vertical fore and aft extending plane and functions to accommodate maximum vertical movement of the platform with concomitant tilting thereof and operates between the wheels 19 and the draft frame 35.

Although for purpose of illustration, the invention is illustrated as applied to a windrower, it is equally applicable to other harvesting machines and it will be apparent that the invention is subject to modification and is limited only by the scope of the appended claims.

What is claimed is:

1. In a harvester, a transverse platform comprising a tube, means for raising and lowering and tilting the platform comprising a shaft extending therethrough beyond opposite ends of said platform, a bell crank member connected to each end of said shaft and having a fore and aft extending leg projecting forwardly of the shaft and an upright leg extending upwardly of said shaft, wheels mounted on said fore and aft legs on axes parallel to the shaft a balance spring connected between the upright arm of each lever and a portion of the platform forwardly thereof and stressed in tension therebetween, a fore and aft extending link pivoted at one end to one of said upright legs and projecting forwardly therefrom, a draft frame extending forwardly of said platform at one side thereof and pivoted thereto for vertical swinging movement on an axis generally parallel to said shaft, an upright element connected to said draft frame and having an upper end pivoted to said link, a lever connected to said platform, a quadrant connected to said draft frame and cooperatively associated with said lever, and means operatively associated with said lever and quadrant for holding the draft frame and platform in selected angular relationship to each other, said platform having forward and rear edges and said shaft disposed intermediate said edges and said wheels disposed ahead of said shaft whereby in the lowered position of the platform said forward edge engages the ground and said rear edge is slightly above the ground.

2. A harvester having a transversely disposed rectangular platform comprising a pair of fore and aft spaced transversely extending front and rear members and a pair of interconnecting fore and aft end members, a shaft beneath said platform journalled thereto and extending generally parallel to said front and rear members and having end portions outwardly of respective end members, an arm connected to each end portion and projecting forwardly therefrom alongside the adjacent end member and terminating in a distal end, a spindle on the distal end of each arm generally parallel to the shaft and a wheel journalled upon the spindle, an upright arm connected to each end portion of the shaft, anchor portions on the frame adjacent to each end member, a tension spring stretched and connected between each arm and the respective anchor portion, a draft frame extending forwardly of the platform and pivotally connected thereto for vertical swinging movement, and means operatively interconnecting said draft frame with one of said upright arms for rotating the same pursuant to swinging movement of the draft frame for raising and lowering the platform, said shaft disposed intermediate said front and rear members to accommodate lowering of said platform at its front and rear to a position adjacent to the ground and below said spindles.

References Cited in the file of this patent

UNITED STATES PATENTS

| | | |
|---|---|---|
| 2,354,962 | Oehler et al. | Aug. 1, 1944 |
| 2,472,762 | Sage | June 7, 1949 |
| 2,507,719 | Kane et al. | May 16, 1950 |
| 2,530,668 | Tallman | Nov. 21, 1950 |
| 2,588,918 | Graham | Mar. 11, 1952 |
| 2,593,617 | Schroeppel | Apr. 22, 1952 |
| 2,684,021 | Ratzlaff | July 20, 1954 |
| 2,691,930 | Forgy | Oct. 19, 1954 |